US012265059B2

(12) United States Patent
Ding et al.

(10) Patent No.: US 12,265,059 B2
(45) Date of Patent: Apr. 1, 2025

(54) SYSTEM AND METHOD FOR AUTOMATED INDICATION CONFIRMATION IN ULTRASONIC TESTING

(71) Applicant: Raytheon Technologies Corporation, Farmington, CT (US)

(72) Inventors: Jerry Ding, Brookfield, WI (US); Greg C. Ojard, Vernon, CT (US); Amit Surana, Newington, CT (US); Ozgur Erdinc, Mansfield, CT (US)

(73) Assignee: RTX Corporation, Farmington, CT (US)

( * ) Notice: Subject to any disclaimer, the term of this patent is extended or adjusted under 35 U.S.C. 154(b) by 750 days.

(21) Appl. No.: 17/352,963

(22) Filed: Jun. 21, 2021

(65) Prior Publication Data

US 2022/0404314 A1      Dec. 22, 2022

(51) Int. Cl.
*G01N 29/04* (2006.01)
*B25J 9/16* (2006.01)
(Continued)

(52) U.S. Cl.
CPC .......... *G01N 29/043* (2013.01); *B25J 9/1679* (2013.01); *B25J 15/0019* (2013.01);
(Continued)

(58) Field of Classification Search
CPC .............. G01N 2291/0289; G01N 2291/2693; G01N 29/043; G01N 29/0645; G01N 29/07;
(Continued)

(56) References Cited

U.S. PATENT DOCUMENTS 3,228,234 A   1/1966 Marklein
4,805,459 A   2/1989 Ferreira
(Continued)

OTHER PUBLICATIONS

Darmon, Michel, and Sylvain Chatillon. "Main features of a complete ultrasonic measurement model: Formal aspects of modeling of both transducers radiation and ultrasonic flaws responses." Open Journal of Acoustics, vol. 03, No. 03, 2013, pp. 43-53, https://doi.org/10.4236/oja.2013.33a008. (Year: 2013).*
(Continued)

*Primary Examiner* — Lisa M Caputo
*Assistant Examiner* — Joshua L Forristall
(74) *Attorney, Agent, or Firm* — Bachman & LaPointe P.C.

(57) ABSTRACT

A system comprising a computer readable storage device readable by the system, tangibly embodying a program having a set of instructions executable by the system to perform the following steps for indication confirmation for detecting a sub-surface defect, the set of instructions comprising: an instruction to initialize a transducer starting location and a transducer orientation responsive to a prior determination of a potential flaw location; an instruction to optimize an observation point of the transducer responsive to the transducer starting location and the transducer orientation responsive to a flaw response model; an instruction to move the transducer to the observation point location and orientation; an instruction to collect the scan data at the observation point location and orientation; and an instruction to analyze the scan data to extract a measure of the flaw response model; and an instruction to update the flaw response model.

19 Claims, 4 Drawing Sheets

(51) Int. Cl.
| | |
|---|---|
| *B25J 15/00* | (2006.01) |
| *G01N 29/22* | (2006.01) |
| *G01N 29/265* | (2006.01) |
| *G01N 29/28* | (2006.01) |
| *G01N 29/44* | (2006.01) |

(52) U.S. Cl.
CPC ......... *G01N 29/225* (2013.01); *G01N 29/265* (2013.01); *G01N 29/28* (2013.01); *G01N 29/4472* (2013.01); *G01N 2291/0289* (2013.01); *G01N 2291/2693* (2013.01)

(58) Field of Classification Search
CPC .... G01N 29/11; G01N 29/225; G01N 29/265; G01N 29/28; G01N 29/4472; B25J 15/0019; B25J 9/1679
USPC .......................................................... 702/39
See application file for complete search history.

(56) References Cited

U.S. PATENT DOCUMENTS

| | | | |
|---|---|---|---|
| 5,445,029 | A | 8/1995 | Falsetti et al. |
| 7,966,860 | B2 | 6/2011 | Dijkstra |
| 8,714,018 | B2 | 5/2014 | Oberdoerfer et al. |
| 9,482,645 | B2 | 11/2016 | Freda et al. |
| 10,875,125 | B2 | 12/2020 | Narayanan et al. |
| 10,928,362 | B2 | 2/2021 | Finn et al. |
| 2003/0234239 | A1 | 12/2003 | Lee et al. |
| 2014/0260627 | A1 | 9/2014 | Ferrari et al. |
| 2016/0231279 | A1* | 8/2016 | Hoyt ...................... G01N 27/83 |
| 2017/0032281 | A1 | 2/2017 | Hsu |
| 2018/0043285 | A1 | 2/2018 | Gagnon et al. |
| 2018/0128657 | A1* | 5/2018 | Crothers .............. G01N 29/225 |
| 2021/0148866 | A1* | 5/2021 | De Schutter .......... G01N 29/04 |
| 2021/0239652 | A1* | 8/2021 | Baelde ................... G01N 29/46 |
| 2021/0302377 | A1* | 9/2021 | Jack ....................... G01N 29/11 |
| 2022/0019190 | A1* | 1/2022 | Mohamed Shibly ....................... G01N 29/4472 |
| 2022/0163488 | A1* | 5/2022 | Nogues ................ G01N 29/043 |
| 2023/0091681 | A1* | 3/2023 | Danilov ............ G01N 29/4436 702/35 |

OTHER PUBLICATIONS

Fuentes, R., et al. "Autonomous ultrasonic inspection using Bayesian optimisation and robust outlier analysis." Mechanical Systems and Signal Processing, vol. 145, 2020, p. 106897, https://doi.org/10.1016/j.ymssp.2020.106897. (Year: 2020).*

Matz et al. "Classification of Ultrasonic Signals". Oct. 2006. International Journal of Materials and Product Technology. vol. 27. Issue 3. pp. 145-155.

Guo et al. "Fully Convolutional Neural Network With GRU for 3D Braided Composite Material Flaw Detection". Oct. 2019. IEEE Access. vol. 7. pp. 151180-151188.

Ye et al. "Computerized Ultrasonic Imaging Inspection: From Shallow to Deep Learning". Oct. 2018. Sensors. vol. 7. Issue 11. pp. 3820.

Virkkunen et al. "Augmented Ultrasonic Data for Machine Learning". Journal of Nondestructive Evaluation, vol. 40, No. 4, Jan. 2021, https://doi.org/10.1007/s10921-020-00739-5.

EP Search Report and Written Opinion issued Jan. 3, 2023 in corresponding EP Application No. 22180256.4.

* cited by examiner

SYSTEM AND METHOD FOR AUTOMATED INDICATION CONFIRMATION IN ULTRASONIC TESTING

BACKGROUND

The present disclosure is directed to the improved process of automatic defect confirmation for the automatic inspection of engine parts using immersion pulse-echo inspection technology.

Aerospace engine components, may incur defects or imperfections during the manufacturing process. Non-destructive testing (NDT) inspections are performed during different stages of the manufacturing process to identify defective parts. Inspection methods include, but are not limited to, visual inspection, X-Ray, thermography, and ultrasonic testing. It is particularly difficult to inspect components that have an internal structure using only external observations. Forms of flaws such as porosity and inclusions in metallic parts are particularly difficult to detect. These types of defects can grow and damage the part in service. Such internal defects are often detected by some form of excitation of the structure (ultrasonic, thermoacoustic, and the like), see for example FIG. 1, sensing of the excitation, and manual interpretation of the sensor signals.

Ultrasonic testing (UT) is a commonly used type of non-destructive testing (NDT) technique used to identify and evaluate potential flaws in manufactured parts. In particular, this technique has an important application towards the inspection of forged rotating parts in gas turbine engines, to identify potential buried flaws formed during the manufacturing process, such as non-metallic inclusions. Such flaws, if left undetected in critical rotating engine parts, could result in significant safety risks due to potential part failures during the lifetime of engine operations on an aircraft.

A typical instantiation of UT is immersion testing, whereby the part to be inspected is immersed within a liquid coupling medium, and its surfaces scanned by one or more ultrasonic transducers. The transducers produce high frequency sound energy pulses directed towards the interior of the part to be inspected. In the case of a buried flaw in the path of travel for the sound wave, a portion of the sound energy would be reflected at the interface between the parent part material and the flaw due to acoustic impedance mismatch. The reflected wave signal is then collected and processed by a data acquisition system to produce both an A-scan waveform, which is a one dimensional (1-D) plot of the reflected amplitude as a function of time, and a C-scan, which is a two dimensional (2-D) plot of amplitude or time-of-flight of the return signal over the scanned surface.

In current practices, C-scans and A-scans are manually examined by inspectors using various inspection criteria to identify potential indications that require further evaluation. Once such potential indications have been identified, a more detailed inspection process is carried out for each indication to confirm whether the particular indication is a likely flaw that should result in part rejection. This process is referred to as indication confirmation, and involves manually manipulating the rotational and translational axes of the UT inspection system in a sequence of motions around the indication in question to identify a peak response, using live visualizations of the A-scan data. The identified peak response is then used to make a determination of whether the part is to be rejected. This manual indication confirmation process is tedious, time-consuming, imprecise, and error prone. It also requires a significant amount of effort, experience, and intervention by trained inspectors, which may prevent future manufacturing paradigms where a single inspector could be responsible for simultaneous inspection of multiple manufactured parts.

What is needed is an accurate, efficient, and automated method of confirming indications during ultrasonic inspections of manufactured parts containing potential buried flaws.

SUMMARY

In accordance with the present disclosure, there is provided a system for indication confirmation for detecting a sub-surface defect comprising a robot having a transducer fluidly coupled to a part located in a tank containing a liquid configured to transmit ultrasonic energy, the transducer configured to scan the part to create scan data of the scanned part; a robot controller coupled to the robot; a pulser/receiver coupled to the transducer configured to receive and transmit the scan data; a processor coupled to the pulser/receiver, the processor configured to communicate with the pulser/receiver and collect the scan data; the processor coupled to the robot controller; and the processor configured to detect the sub-surface defect and to confirm indications of the sub-surface defect.

A further embodiment of any of the foregoing embodiments may additionally and/or alternatively include the system further comprises a tangible, non-transitory memory configured to communicate with the processor, the tangible, non-transitory memory having instructions stored therein that, in response to execution by the processor, cause the processor to perform operations comprising initialization of a transducer starting location and transducer orientation responsive to a prior determination of a potential flaw location; optimization of an observation point of the transducer responsive to the transducer starting location and the transducer orientation responsive to a flaw response model; moving the transducer to achieve the observation point location and orientation; collecting the scan data at the observation point location and orientation; analyzing the scan data to extract a measure of the flaw response model; and updating the flaw response model.

A further embodiment of any of the foregoing embodiments may additionally and/or alternatively include the prior determination of a potential flaw location further comprises determining the potential flaw location by an automated flaw detection module using a C-scan analysis.

A further embodiment of any of the foregoing embodiments may additionally and/or alternatively include the system further comprises initialization of the flaw response model, the flaw response model comprising a mathematical approximation of a flaw response.

A further embodiment of any of the foregoing embodiments may additionally and/or alternatively include the optimization of the observation point of the transducer is carried out based upon an initial transducer location and orientation and the flaw response model.

A further embodiment of any of the foregoing embodiments may additionally and/or alternatively include the step of analyzing the scan data to extract a measure of the flaw response model comprises utilizing a maximum amplitude in the A-scan data within a flaw gate.

A further embodiment of any of the foregoing embodiments may additionally and/or alternatively include the system further comprises repeating the steps above until a stopping criterion is met.

In accordance with the present disclosure, there is provided a system comprising a computer readable storage device readable by the system, tangibly embodying a program having a set of instructions executable by the system to perform the following steps for indication confirmation for detecting a sub-surface defect, the set of instructions comprising: an instruction to initialize a transducer starting location and a transducer orientation responsive to a prior determination of a potential flaw location; an instruction to optimize an observation point of the transducer responsive to the transducer starting location and the transducer orientation responsive to a flaw response model; an instruction to move the transducer to the observation point location and orientation; an instruction to collect the scan data at the observation point location and orientation; and an instruction to analyze the scan data to extract a measure of the flaw response model; and an instruction to update the flaw response model.

A further embodiment of any of the foregoing embodiments may additionally and/or alternatively include the system further comprises an instruction to initialize the flaw response model, the flaw response model comprising a mathematical approximation of a flaw response.

A further embodiment of any of the foregoing embodiments may additionally and/or alternatively include the optimization of the observation point of the transducer is carried out based upon an initial transducer location and orientation and the flaw response model.

A further embodiment of any of the foregoing embodiments may additionally and/or alternatively include the step of analyzing the scan data to extract a measure of the flaw response model comprises utilizing a maximum amplitude in the A-scan data within a flaw gate.

A further embodiment of any of the foregoing embodiments may additionally and/or alternatively include the instruction to optimize the observation point of the transducer further comprising: exploration of a new observation point having more uncertainty; or exploitation of an observation point where good response has been obtained with high confidence; the exploration or the exploitation being responsive to use of a black box gradient free optimization technique.

A further embodiment of any of the foregoing embodiments may additionally and/or alternatively include the instruction to optimize the observation point of said transducer further comprising an instruction to incorporate constraints on different degree of freedom motions of the transducer; and an instruction to generate motions which comply with the constraints.

In accordance with the present disclosure, there is provided a process for indication confirmation for detecting a sub-surface defect by use of a system including a robot having a transducer fluidly coupled to a part located in a tank containing a liquid configured to transmit ultrasonic energy, the transducer configured to scan the part to create scan data of the scanned part; a robot controller coupled to the robot; a pulser/receiver coupled to the transducer configured to receive and transmit the scan data; a processor coupled to the pulser/receiver, the processor configured to communicate with the pulser/receiver and collect the scan data; the processor coupled to the robot controller; and the processor configured to detect the sub-surface defect, a tangible, non-transitory memory configured to communicate with the processor, the tangible, non-transitory memory having instructions stored therein that, in response to execution by the processor, cause the processor to perform operations comprising: initialization, by the processor, of a transducer starting location and transducer orientation responsive to a prior determination of a potential flaw location; optimization, by the processor, of an observation point of the transducer responsive to the transducer starting location and the transducer orientation responsive to a flaw response model; moving, by the processor, the transducer to achieve the observation point location and orientation; collecting, by the processor, the scan data at the observation point location and orientation; analyzing, by the processor, the scan data to extract a measure of the flaw response model; and updating, by the processor, the flaw response model.

A further embodiment of any of the foregoing embodiments may additionally and/or alternatively include the prior determination of a potential flaw location further comprises determining the potential flaw location by an automated flaw detection module using a C-scan analysis.

A further embodiment of any of the foregoing embodiments may additionally and/or alternatively include the process further comprises initialization of the flaw response model, the flaw response model comprising a mathematical approximation of a flaw response.

A further embodiment of any of the foregoing embodiments may additionally and/or alternatively include the optimization of the observation point of the transducer is carried out based upon an initial transducer location and orientation and the flaw response model.

A further embodiment of any of the foregoing embodiments may additionally and/or alternatively include the step of analyzing the scan data to extract a measure of the flaw response model comprises utilizing a maximum amplitude in A-scan data within a flaw gate.

A further embodiment of any of the foregoing embodiments may additionally and/or alternatively include the instruction to optimize the observation point of the transducer further comprising exploration of a new observation point having more uncertainty; or exploitation of an observation point where good response has been obtained with high confidence; the exploration or the exploitation being responsive to use of a black box gradient free optimization technique.

A further embodiment of any of the foregoing embodiments may additionally and/or alternatively include the process further comprises repeating the steps until a stopping criterion is met.

Other details of the process are set forth in the following detailed description and the accompanying drawings wherein like reference numerals depict like elements.

DETAILED DESCRIPTION

Figure 1:
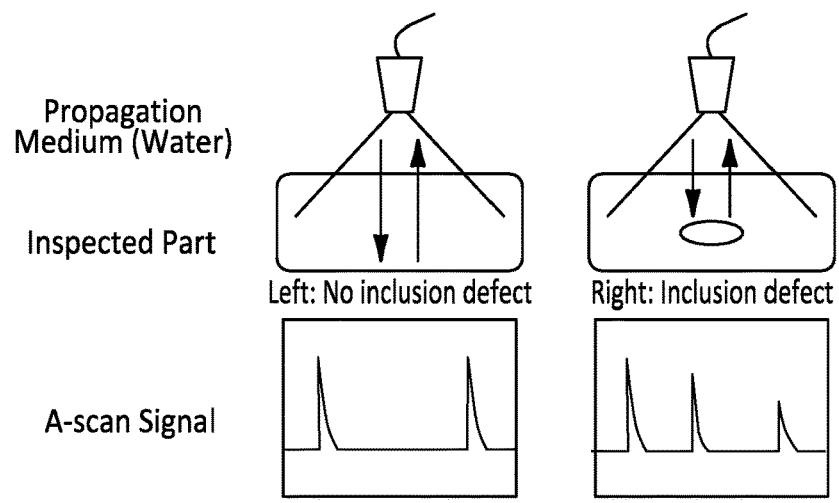
FIG. 1 is a schematic of an exemplary manual inspection system.
Figure 2:
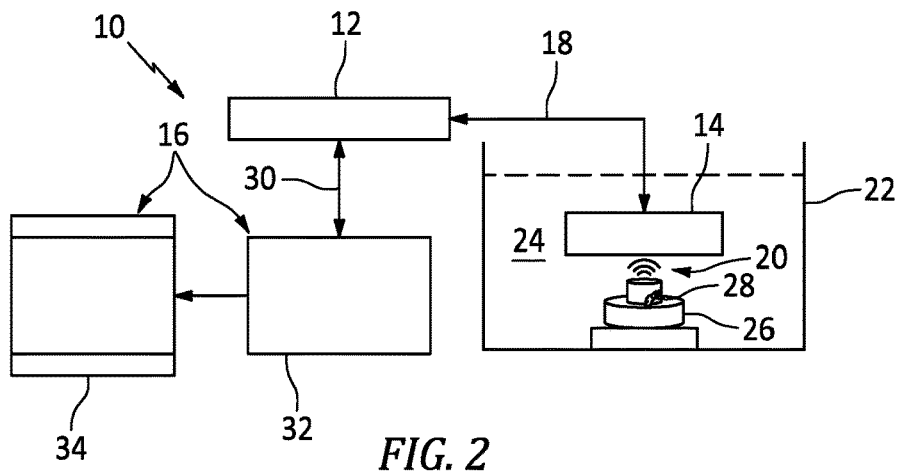
FIG. 2 is a schematic of an exemplary ultrasonic testing inspection system.

Referring now to FIG. 2, the exemplary ultrasonic testing (UT) inspection system 10 is shown. The UT inspection system 10 includes several functional units, such as a pulser/receiver 12, transducer 14, and display devices 16. A pulser/receiver 12 is an electronic device that can produce high voltage electrical pulses 18. Driven by the pulser 12, the transducer 14 generates high frequency ultrasonic energy (sound energy) 20. The sound energy 20 is introduced and propagates in the form of waves through the materials (liquid coupling medium) in the UT tank 22, such as water 24, and the part being inspected 26, like an engine disk. When there is a discontinuity (indication) 28 in the part 26, such as a crack, located in the wave path, a portion of the energy 20 will be reflected back from the discontinuity 28 surface. The transducer 14 can detect the reflected energy wave. The reflected wave signal is transformed into scan data 30 relayed in the form of an electrical signal 18 by the transducer 14 and relayed to a first processor 32 and displayed on a screen 16 (Computer 1 in FIG. 2). A second processor 34 (Computer 2 in FIG. 2) is configured to automatically analyze the scan data 30 to distinguish between actual part defects and spurious indications of defects.

Figure 3:
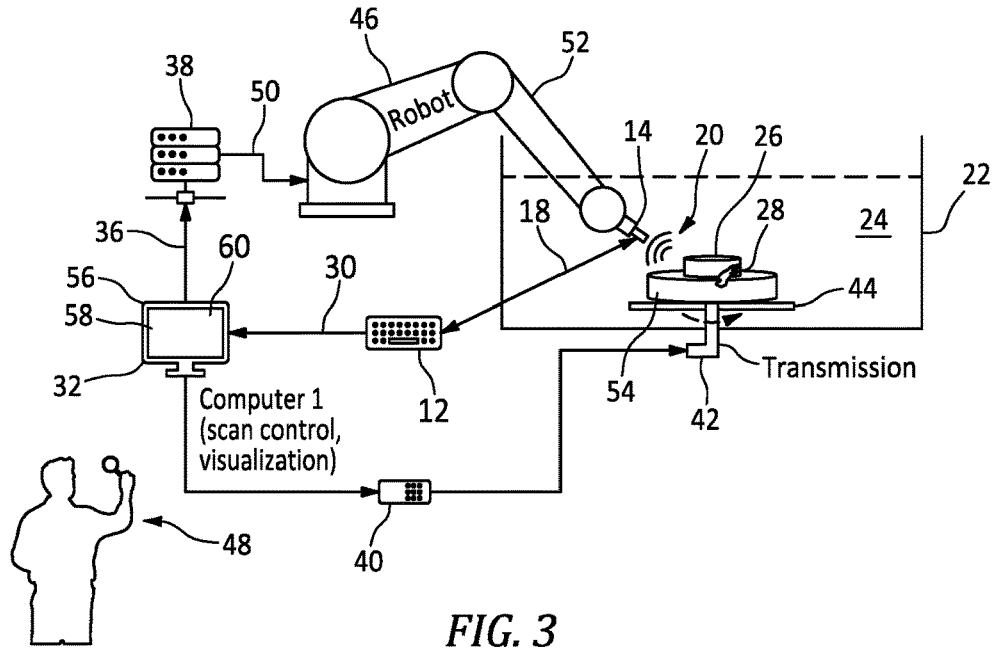
FIG. 3 is a schematic of an exemplary ultrasonic testing inspection system.

A more detailed schematic of the interactions between first processor 32 and the UT tank 22 is also shown in FIG. 3. The first processor 32 is responsible for multiple functions. One of those functions includes sending scan plan information 36 to a robot controller 38. The first processor 32 can communicate with a motor controller 40. The motor controller 40 is configured to operate a motor 42 to rotate a turntable 44 supporting the inspected part 26. The first processor 32 can also receive scan signal data 30 from the pulser/receiver 12 received from the transducer 14 coupled to a robot 46 to be displayed for review by an inspector 48.

The scan plan 36 contains instructions 50 for moving a robotic arm 52 and positioning the transducer 14 around the inspected part 26 for collection of scan data 30. The data 30 can be collected by scanning every surface 54 of the part 26 until the totality of surfaces 54 of the part 26 that cover the entirety of the part 26 volume have been scanned. In order to generate a scan plan 36, the inspector 48 configures the scan by setting parameters 56 in a UT tank vendor software 58 installed on the first processor 32. The values of such parameters 56 depend on the inspected part 26; some parameters 56 and their representative values include water path length, that is, the distance between the tip of the transducer 14 and the inspected part 26 of for example, 100 mm.

The pulser/receiver 12 produces outgoing electrical pulses 18 to the transducer 14 and receives/amplifies returning pulses 18 from the transducer 14. The robotic arm 52 aides in the translation (spatial coordinates) and angulation (tilting) of the transducer 14 according to the scan plan 36. A single transducer 14 generates and receives sound wave signals 20 that traverse the liquid coupling medium 24 and the inspected part 26.

Figure 8:
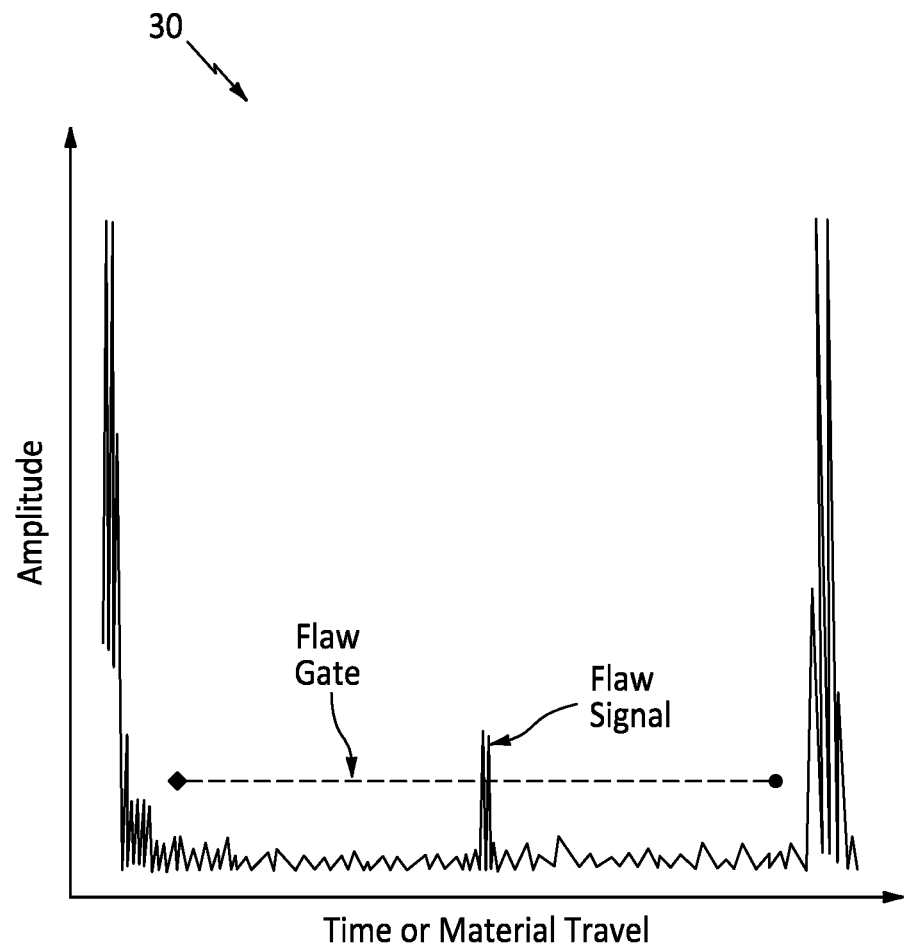
FIG. 8 is a schematic of an A-scan waveform.

One of the main uses of the UT inspection system 10 is for detecting and evaluating flaws or defects in physical parts 26, such as turbine components of gas turbine engines. Flaw identification (indication 28) is performed by scanning parts 26 by pulser/receiver 12, transducer 14, and display devices 32, 34. Ultrasonic data 30 of the scanned part 26 can be formatted into three presentations: A-scan, B-scan, and C-scan. The A-scan presentation (as seen in FIG. 8) is a one dimension, 1-D plot that displays the amount of received ultrasonic energy (vertical axis) as a function of time (horizontal axis). The B-scan presentation is a cross-sectional, two dimension, 2-D profile of the time-of-flight (time travel or depth) of the sound energy in the vertical axis and the linear position of the transducer 14 in the horizontal axis. Lastly, the C-scan presentation is also a 2-D plot that captures a plan-type view of the location and size of the part; plots for either relative signal amplitude or time-of-flight may be generated. Multiple presentation scans can be used together for more accurate determinations of the condition of the part 26.

Also referring to FIG. 3, a system for defect recognition with a processor 60 for automatic inspection of engine parts 26 using immersion pulse-echo inspection technology as described above is shown. The defect recognition processor 66 can include one or more processors (for example, computer systems having a central processing unit and memory) for recording, processing and storing the data received. The processor 60 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof.

Figure 4:
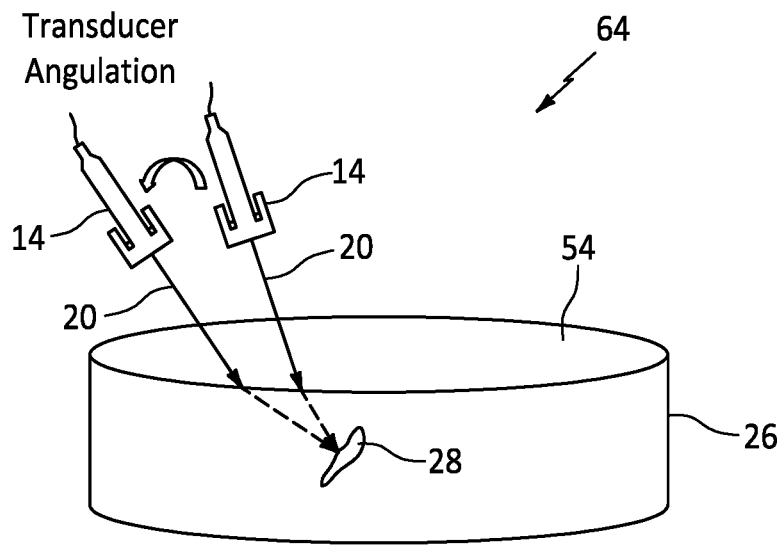
FIG. 4 is a schematic of angulation during indication confirmation by an exemplary ultrasonic testing inspection system.
Figure 5:
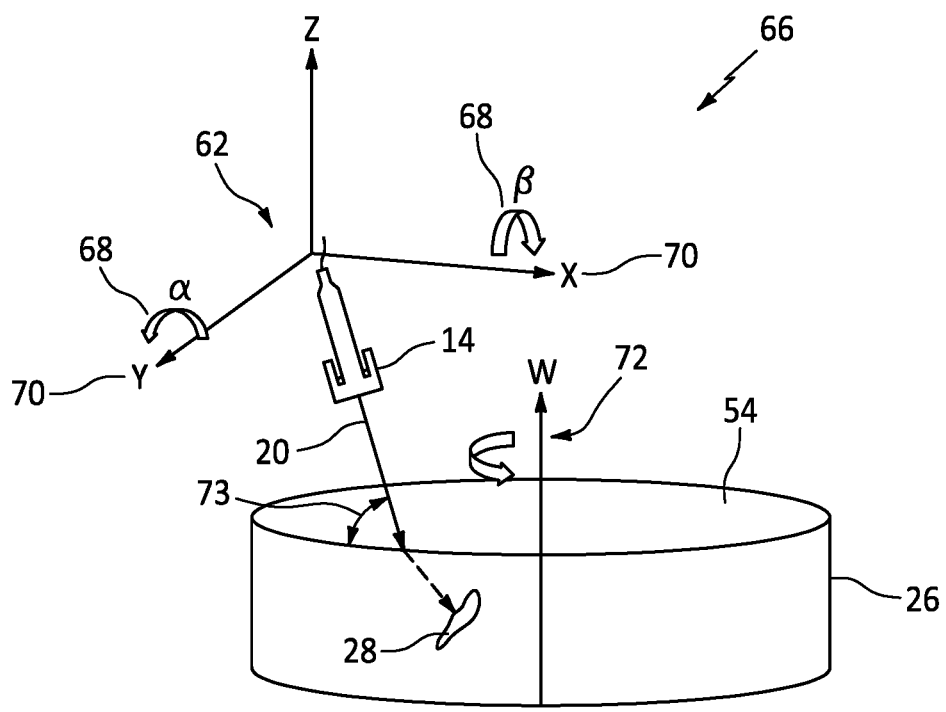
FIG. 5 is a schematic of an exemplary transducer degrees of freedom in the exemplary ultrasonic testing inspection system.

Referring also to FIG. 4 and FIG. 5, as mentioned previously, certain processes for indication confirmation during ultrasonic inspections involve an inspector 48 manually manipulating the various axes of motion 62 of an UT inspection system 10 to identify the peak response from a potential indication 28 detected using UT scans. The primary axes to be manipulated are the rotational axes of the transducer 14, which are perturbed from the surface normal to account for potential flaws that may not be oriented parallel to the part surface 54.

Consequently, this process is sometimes also referred to as an angulation process 64. It should be noted, however, that the rotational motions of the transducer are also accompanied by translational motions to account for effects of refraction as the sound wave 20 passes through the interface between the liquid coupling medium 24 and the part material 26.

The selection of the sequence of transducer 14 motions, as well as the magnitude of such motions, can be based upon the domain expertise and prior experience of trained inspectors. Moreover, the accompanying analysis of the scan data 30 to determine a maximal flaw response and whether the part 26 is to be rejected based upon this response can be done by trained inspectors. Manual angulation process to identify maximal flaw response using an immersion UT inspection system 10 involves both the transducer 14 rotational motions 68, a and coupled with translational motions 70 in X and Y axis, as well as turntable rotational motion 72 W to compensate for possible effects of refraction due to varying sound wave incidence angles 74 on the part surface 54.

Figure 6:
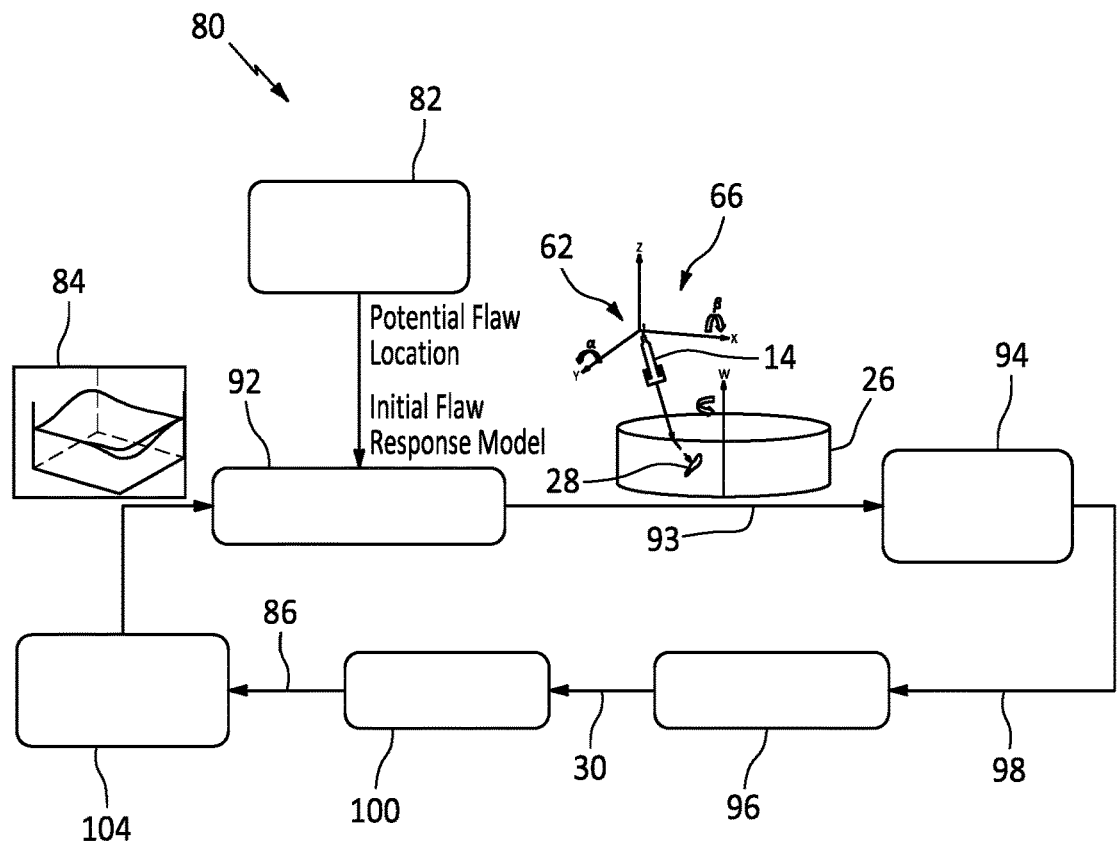
FIG. 6 is a schematic of an exemplary automatic indication confirmation process map.

Referring also to FIG. 6 an improved process for automated selection of transducer 14 motions, and automated analysis of UT scan data 30 to provide efficient and accurate determination of maximal flaw response using a high DOF UT inspection system 10 can be seen. The process 80 begins with process step 82 for initialization of optimization parameters. This includes the initialization of the transducer 14 starting location and orientation, based upon prior determination of a potential flaw 28 location. This could, for example, be determined by an automated flaw detection module using C-scan analysis. This step 82 also includes the initialization of a flaw response model, which is a mathematical approximation of the true flaw response. It should be noted that the true flaw response can be unknown a priori, due to its complicated dependence on the flaw 28 type (for example, inclusions or pores), orientation, material type, and geometry within the part 26.

Figure 7:
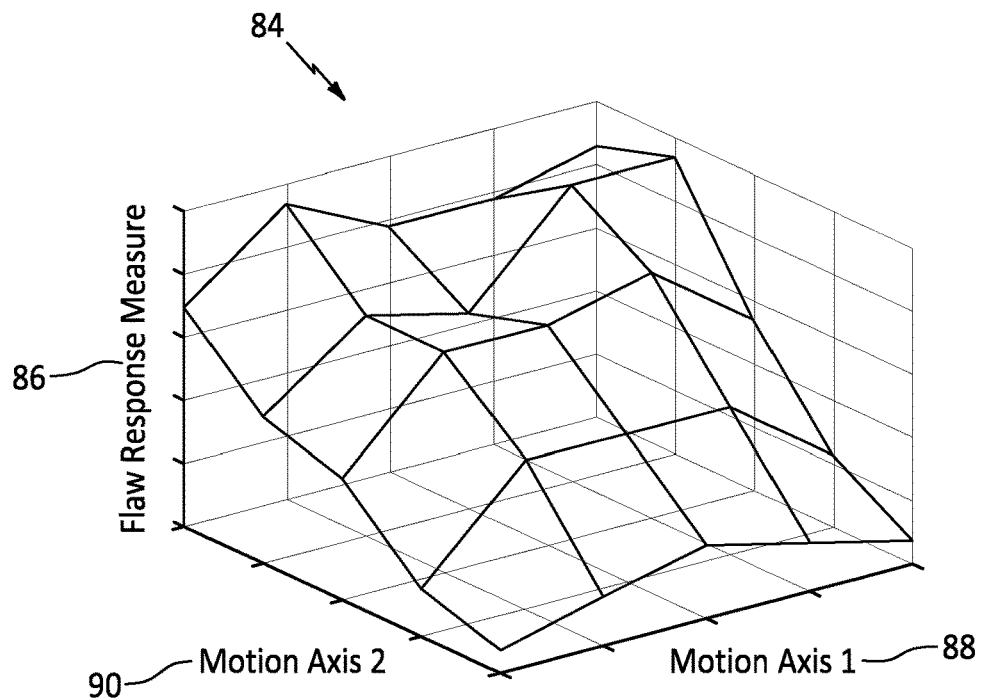
FIG. 7 is a graphic of flaw response as a function of system motion axes.

A notional illustration of an example flaw response function 84 is shown at FIG. 7. The notional illustration shown at FIG. 7 includes a flaw response measure 86 and a motion axis 1 88 and motion axis 2 90. It should be noted that this is a simplified diagram for visualization purposes, as high DOF UT systems can feature more than two motion axes 62. The initialization of the flaw response model could be based upon a combination of encoding domain knowledge provided by subject matter experts (for example, trained inspectors), analysis of C-scan data used for flaw detection, and physics-based or data-driven modeling (for example, using machine learning techniques) of flaw response 84. Moreover, the flaw response function may have a complex dependence on the various axes of motion 62 (e.g. α, β, X, Y, W), with multiple global and local optima, due to refraction of sound waves 20.

Following the initialization step 82, one then proceeds to step 92 for optimization of the observation point 93. In the first iteration of this process, the optimization is carried out based upon the initial transducer 14 location and orientation, and the initial flaw response model 84, as described above. Since the flaw response model 84 is especially inaccurate at locations where observations have not been made, the optimization process step 92 should tradeoff exploration (of a new observation point 93 where there is more uncertainty) vs. exploitation (observation points 93 where good response has been obtained with high confidence). A black box gradient free optimization technique, such as Bayesian optimization can be particularly suitable within such contexts.

In particular, Bayesian optimization uses Gaussian process model to represent and update the black box function (which in our context will be the flaw response model 84). Other black box approaches such as evolutionary algorithms, simulated annealing, and local modeling (gradient/hessian) could also be applied, but typically are not as efficient as Bayesian optimization, which attempts to minimize the number of function evaluation calls to arrive at a global optimum. The disclosed optimization procedure also allows one to incorporate constraints on different DOF motions of the transducer 14 and generate motions which comply with those constraints. For example, constraint on motion may have to be imposed so that the transducer 14 does not collide with the part 26. Furthermore, based on domain knowledge other constraints could be imposed on α and β 68, (x, y) 70 and W 72 to bias the search in specific ranges of angles and positions of the transducer 14 which have a higher chance of finding a maximum flaw response. For example, one could constrain the search to occur only in a predetermined neighborhood of a prior determined flaw location and/or angles can be constrained so that due to refraction their choices do not result in transducer 14 angulations which throw the sound beam 29 off the flaw location. Irrespective of the approach used, this optimization step 92 produces a selection of the next best observation point 93, which could be in the form of a direct command to the various axes of motion of an UT inspection system 10, such as illustrated in FIG. 5, or an abstraction thereof.

Upon receiving this command, the UT inspection system 10 then carries out step 94 by executing the UT system motions required to achieve this observation point 93, while taking into account possible physical constraints, such as collision avoidance with respect to the inspected part 26.

Once these motions are complete, the UT inspection system 10 then proceeds to step 96 by collecting the A-scan data 30 with an updated system configuration 98. An example A-scan waveform 30 representative of data collected during this process step is shown in FIG. 8. The amplitude is on the vertical axis and the time or material travel is on the horizontal axis.

In step 100 of the process 80, the A-scan data obtained from the UT inspection system 10 is analyzed to extract a measure of the flaw response 86. This could, for example, be the maximum amplitude in the A-scan data 30 within a flaw gate 102. One then proceeds to step 104, where the extracted flaw response measure 86 is used to update the flaw response model 84, as a best estimate of the true flaw response based upon the observations received so far. One then returns to step 92, where the process begins anew with optimization of the next observation point 93, based upon the updated flaw response model 84.

This process 80 can be repeated until a stopping criterion is met for the optimization process. This could, for example, be the case where a maximum iteration count is reached, or the case where a satisfactory solution is obtained in terms of a maximal flaw response 106 and a corresponding optimal observation point 93. To complete the indication confirmation process, the maximal flaw response 106 could then be analyzed with respect to specified inspection criterion to make a determination of whether the flaw 28 is sufficiently severe to warrant part 26 rejection.

A technical advantage of the disclosed process can include the efficiency from the use of an optimization-based process to intelligently select a small set of observation points to provide sufficient information for determining a maximal flaw response.

Another technical advantage of the disclosed process can include the accuracy of this process arising from the use of an underlying flaw response model that is continuously updated and refined as new observations are received over multiple iterations of the indication confirmation process.

Another technical advantage of the disclosed process can include an automated, optimization-based process for intelligent selection of transducer motions for a high DOF UT inspection system using a flaw response model.

Another technical advantage of the disclosed process can include an iterative update of the flaw response model based on sequential observations derived from UT scan data for the purpose of efficient and accurate indication confirmation during UT inspections.

Another technical advantage of the disclosed process can include the usage of black box approaches providing a generic framework that can be applied to any part geometry, material and UT machine.

There has been provided a process. While the process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A system for indication confirmation for detecting a sub-surface defect comprising:
   a robot having a transducer fluidly coupled to a part located in a tank containing a liquid coupling medium configured to transmit ultrasonic energy, said transducer configured to scan said part to traverse the liquid coupling medium and the inspected part in the absence of contacting the part to create scan data of the scanned part;
   a robot controller coupled to said robot;
   a pulser/receiver coupled to said transducer configured to receive and transmit said scan data;

a processor coupled to said pulser/receiver, said processor configured to communicate with said pulser/receiver and collect said scan data; said processor coupled to said robot controller; said processor configured to detect said sub-surface defect and to confirm indications of said sub-surface defect;

a tangible, non-transitory memory configured to communicate with said processor, the tangible, non-transitory memory having instructions stored therein that, in response to execution by the processor, cause the processor to perform operations comprising:

initialization of a transducer starting location and transducer orientation responsive to a prior determination of a potential flaw location;

optimization of an observation point of said transducer responsive to at least one of said transducer starting location and said transducer orientation responsive to a flaw response model of sub-surface defects;

moving said transducer to achieve said observation point location and orientation;

collecting said scan data at said observation point location and orientation;

analyzing said scan data to extract a measure of said flaw response model; and updating said flaw response model.

2. The system according to claim 1,
wherein the prior determination of a potential flaw location further comprises determining said potential flaw location by an automated flaw detection module using a C-scan analysis.

3. The system according to claim 1, further comprising:
initialization of the flaw response model, said flaw response model comprising a mathematical approximation of a flaw response.

4. The system according to claim 1,
wherein said optimization of the observation point of said transducer is carried out based upon an initial transducer location and orientation and the flaw response model.

5. The system according to claim 1,
wherein said step of analyzing said scan data to extract a measure of said flaw response model comprises utilizing a maximum amplitude in the A-scan data within a flaw gate.

6. The system according to claim 1, further comprising:
repeating the steps of claim 1 until a stopping criterion is met.

7. A system comprising a computer readable storage device readable by the system, tangibly embodying a program having a set of instructions executable by the system to perform the following steps for indication confirmation for detecting a sub-surface defect, the set of instructions comprising:

an instruction to initialize a transducer starting location and a transducer orientation responsive to a prior determination of a potential flaw location;

an instruction to optimize an observation point of said transducer responsive to said transducer starting location and said transducer orientation responsive to a flaw response model of sub-surface defects;

an instruction to move said transducer to said observation point location and orientation to scan a part to traverse a liquid coupling medium and the inspected part in the absence of contacting the part to create scan data of the scanned part;

an instruction to collect said scan data at said observation point location and orientation; and an instruction to analyze said scan data to extract a measure of said flaw response model; and an instruction to update said flaw response model.

8. The system according to claim 7, further comprising:
an instruction to initialize the flaw response model, said flaw response model comprising a mathematical approximation of a flaw response.

9. The system according to claim 7, wherein said optimization of the observation point of said transducer is carried out based upon an initial transducer location and orientation and the flaw response model.

10. The system according to claim 7, wherein said step of analyzing said scan data to extract a measure of said flaw response model comprises utilizing a maximum amplitude in the A-scan data within a flaw gate.

11. The system according to claim 7, wherein said instruction to optimize the observation point of said transducer further comprising:

exploration of a new observation point having more uncertainty; or exploitation of an observation point where a response has been obtained with high confidence; and said exploration or said exploitation being responsive to use of a black box gradient free optimization technique.

12. The system according to claim 7, wherein said instruction to optimize the observation point of said transducer further comprising:

an instruction to incorporate constraints on different degree of freedom motions of the transducer; and an instruction to generate motions which comply with the constraints.

13. A process for indication confirmation for detecting a sub-surface defect by use of a system including a robot having a transducer fluidly coupled to a part located in a tank containing a liquid coupling medium configured to transmit ultrasonic energy, said transducer configured to scan said part traversing the liquid coupling medium and the inspected part in the absence of contacting the part to create scan data of the scanned part; a robot controller coupled to said robot; a pulser/receiver coupled to said transducer configured to receive and transmit said scan data; a processor coupled to said pulser/receiver, said processor configured to communicate with said pulser/receiver and collect said scan data; said processor coupled to said robot controller; and said processor configured to detect said sub-surface defect, a tangible, non-transitory memory configured to communicate with said processor, the tangible, non-transitory memory having instructions stored therein that, in response to execution by the processor, cause the processor to perform operations comprising:

initialization, by the processor, of a transducer starting location and transducer orientation responsive to a prior determination of a potential flaw location;

optimization, by the processor, of an observation point of said transducer responsive to said transducer starting location and said transducer orientation responsive to a flaw response model of sub-surface defects;

moving, by the processor, said transducer to achieve said observation point location and orientation so that the transducer does not collide with the part;

collecting, by the processor, said scan data at said observation point location and orientation;

analyzing, by the processor, said scan data to extract a measure of said flaw response model; and updating, by the processor, said flaw response model.

14. The process according to claim 13, wherein the prior determination of a potential flaw location further comprises determining said potential flaw location by an automated flaw detection module using a C-scan analysis.

15. The process according to claim 13, further comprising:
   initialization of the flaw response model, said flaw response model comprising a mathematical approximation of a flaw response.

16. The process according to claim 13, wherein said optimization of the observation point of said transducer is carried out based upon an initial transducer location and orientation and the flaw response model.

17. The process according to claim 13, wherein said step of analyzing said scan data to extract a measure of said flaw response model comprises utilizing a maximum amplitude in A-scan data within a flaw gate.

18. The process according to claim 13, wherein said instruction to optimize the observation point of said transducer further comprising:
   exploration of a new observation point having more uncertainty; or
   exploitation of an observation point where good response has been obtained with high confidence;
   said exploration or said exploitation being responsive to use of a black box gradient free optimization technique.

19. The process according to claim 13, further comprising:
   repeating the steps of claim 13 until a stopping criterion is met.

* * * * *